F. SCHWAMB.
Cutter-Head.
No. 161,447.  Patented March 30, 1875.
Fig I
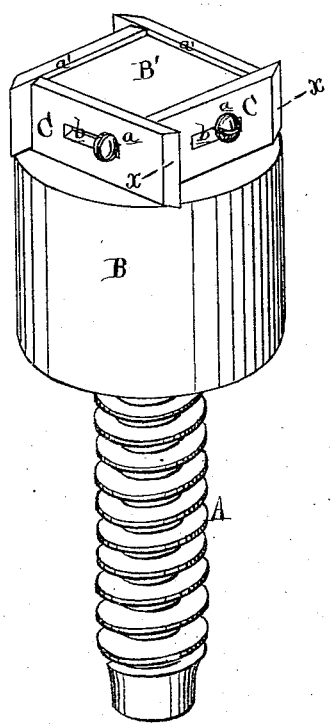
Fig II
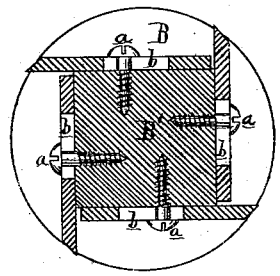
Attest  
H. Sprague  
H. F. Eberts
Inventor  
F. Schwamb  
By Atty  
Thos. S. Sprague

UNITED STATES PATENT OFFICE.

FREDERICK SCHWAMB, OF CHICAGO, ILLINOIS.

IMPROVEMENT IN CUTTER-HEADS.

Specification forming part of Letters Patent No. 161,447, dated March 30, 1875; application filed February 7, 1873.

*To all whom it may concern:*

Be it known that I, FREDERICK SCHWAMB, of Chicago, in the county of Cook and State of Illinois, have invented a new and useful Improvement in Cutter-Heads; and I do declare that the following is a true and accurate description thereof, reference being had to the accompanying drawings, and to the letters of reference marked thereon, and being a part of this specification, in which—

Figure 1 is a perspective view of my improved cutter-head, and Fig. 2 is a cross-section of the same on the plane $x\,x$ in Fig. 1.

Like letters refer to like parts in both figures.

This invention relates to an improvement in cutter-heads; and consists in the construction of the cutter-head and cutters, the same being combined to cut the entire surface downward, or in a vertical line, into a frame or other article, which is accomplished by having the cutters extend beyond the line of the head to which they are secured, and by having the entire upper surface or edge of the cutters beveled, so that the highest point is on the inside edge of the cutters, as hereinafter more fully described.

In the drawing, A represents the screw-spindle of an ordinary molding or shaping machine, on which is screwed the cylindrical cutter-head B, the head of which is cut away to form an inscribed square, B', which is a part of the head B, by which means the cutters are allowed to extend above the part B', so that the cutters can cut in a vertical line the entire surface inscribed by the cutters, as in cutting out picture-frames by one operation. To each face of the square B' is secured a cutter, C, by a screw, $a$, passing through a slot, $b$, in the cutter. These cutters are tapered from heel to point, so that the cutting-edge is slightly wider than the heel of the cutter, to clear the body in the rabbet cut by it in the rotation of the head in the wood, which is secured to a templet moved in contact with the cylindrical body of the cutter-head, which projects above the plane of the table when in use. The upper edge of these cutters C is beveled from the outside to the inside, as shown at $a'$, so that in cutting directly down the entire surface is cut away, there being no raised projections in the center to prevent the same.

If desired, the lower edges of the cutter may rest in grooves cut in the cylinder, to steady them in position and to reduce the strain on the screws.

The advantages are, that the cutters are easily adjusted and removed, that the radius to be cut may be varied at will, and that, after sharpening or grinding away the cutting-edges, the cutters may be set far enough ahead to cut in the same radius as before. This cutter-head can also be screwed onto a lathe-spindle, to perform as in a shaper in an emergency.

I am aware of Patent No. 130,684, and disclaim all devices therein shown; but

Having thus fully described my invention, what I do claim, and desire to secure by Letters Patent, is—

The cutter-head B, with square portion B', cut away as described, in combination with cutters C, having beveled cutting-edges $a'$ extending beyond the part B', all constructed substantially as and for the purpose specified.

FREDERICK SCHWAMB.

Witnesses:
WM. H. LOTZ,
GEO. FERRIS.